(12) United States Patent
Tsai

(10) Patent No.: US 7,312,291 B2
(45) Date of Patent: Dec. 25, 2007

(54) CONCRETE ADMIXTURE ADDITIVE

(75) Inventor: Theresa Tsai, Yangmei Chen (TW)

(73) Assignee: Taiwan Gwan Chian Industrial Co., Ltd., Taoyuan Hsien (TW)

( * ) Notice: Subject to any disclaimer, the term of this patent is extended or adjusted under 35 U.S.C. 154(b) by 203 days.

(21) Appl. No.: 10/655,343

(22) Filed: Sep. 4, 2003

(65) Prior Publication Data

US 2005/0054796 A1    Mar. 10, 2005

(51) Int. Cl.
*C08F 222/08* (2006.01)
*C08F 132/08* (2006.01)

(52) U.S. Cl. ................. 526/272; 526/280; 526/282; 526/284; 526/304; 526/307.8; 526/332; 526/333; 526/347; 526/348; 526/348.6

(58) Field of Classification Search ............ 526/272, 526/282, 284, 304, 307.8, 332, 333, 347, 526/348, 348.6, 280
See application file for complete search history.

(56) References Cited

U.S. PATENT DOCUMENTS

| | | | |
|---|---|---|---|
| 5,612,396 A * | 3/1997 | Valenti et al. ................. 524/5 |
| 6,503,319 B1 * | 1/2003 | Courage et al. ............ 106/737 |
| 6,573,316 B1 * | 6/2003 | Albrecht et al. ............. 524/96 |

* cited by examiner

*Primary Examiner*—Helen L Pezzuto
(74) *Attorney, Agent, or Firm*—Birch, Stewart, Kolasch and Birch, LLP

(57) ABSTRACT

A new family of concrete admixture additives can be derived from reacting a mixture of olefins/cyclic olefins-maleic anhydride copolymers and methoxy polyethylene glycol amines and/or polyethylene glycol monoalkyl ethers, or a mixture of styrene-maleic anhydride copolymers and methoxy polyethylene glycol amines and/or polyethylene glycol monoalkyl ethers, or a mixture of styrene-olefins/cyclic olefins-maleic anhydride terpolymers and methoxy polyethylene glycol amines and/or polyethylene glycol monoalkyl ethers. These reactions lead to formation of a kind of carboxylic salt containing polymer, which can be used alone in concrete. Only a small amount of this substance is needed to provide excellent water reduction, high concrete flowability and high early strength.

9 Claims, 2 Drawing Sheets

CONCRETE ADMIXTURE ADDITIVE

BACKGROUND OF THE INVENTION (a) Field of the Invention

The present invention relates to a concrete admixture additive for water reduction and to the process of making the same.

(b) Description of the Related Art

In a typical concrete mixing process, a large amount of water is added to increase flowability of the concrete. However, water overdose lowers concrete compression strength and adversely affects other properties. While on the contrary, lack of water causes concrete slump and deterioration, which is harmful to a construction process. Many chemical additives have been invented in the past to improve concrete flowability without the need of increasing the amount of water.

Traditional concrete water reducers are formed by mixing lignin as main component with naphthalene sulfonic acid sodium salt. Although the cost of such kind of additives is relatively low, they cannot provide desirable concrete water reduction when the effective content in the concrete is low. For example, when a type F water reducer, which consists mainly of naphthalene-based compounds, is used, rapid concrete slump will result.

Recently copolymers of acrylic acid or maleic anhydride and alkenyl ethers and their derivatives have been found to improve concrete admixture flowability. [Japanese Patent Publication (Kokai) Nos 285140/88 and 163108/90]. Besides, copolymers of maleic acid and its salt and ester derivatives and hydroxy-terminated allyl ether and copolymers of maleic acid and partially esterified styrene are known to enhance concrete admixture flowability [U.S. Pat. Nos. 4,471,100 and 5,158,996]. Such chemical reagents are classified as carboxylic type additives. But those concrete additives still can not provide all the required properties. For example, although esterified acrylic acid copolymers provide good concrete admixture flowability, they also prolong the hardening time.

In view of the above, a new family of concrete admixture additives is disclosed and claimed in the present invention. These additives, even at a relatively low additive level, can provide improved water reduction, increase concrete flowability, reduce concrete slump and enhance compression strength. In addition, the processes of making such concrete admixture additives are also disclosed and claimed.

BRIEF SUMMARY OF THE INVENTION

The objective of the present invention is to provide a chemical additive that can be blended into concrete admixture to increase the flowability, reduce the slump and enhance the compression strength of the concrete admixture without needing additional water in the concrete admixture.

A concrete admixture additive of the invention was derived from reacting a mixture of olefins/cyclic olefins-maleic anhydride copolymers and methoxy polyethylene glycol amines and/or polyethylene glycol monoalkyl ethers, or a mixture of styrene-maleic anhydride copolymers and methoxy polyethylene glycol amines and/or polyethylene glycol monoalkyl ethers, or a mixture of styrene-olefins/cyclic olefins-maleic anhydride terpolymers and methoxy polyethylene glycol amines and/or polyethylene glycol monoalkyl ethers. These reactions lead to the formation of a kind of carboxylic salt containing polymer, which can be used alone as additive in concrete admixture. Only a small amount of this substance is needed to provide excellent water reduction, high concrete flowability and high early strength. Due to these properties, the additive is very useful in providing more options of construction method.

DETAILED DESCRIPTION OF THE INVENTION

Figure 1:
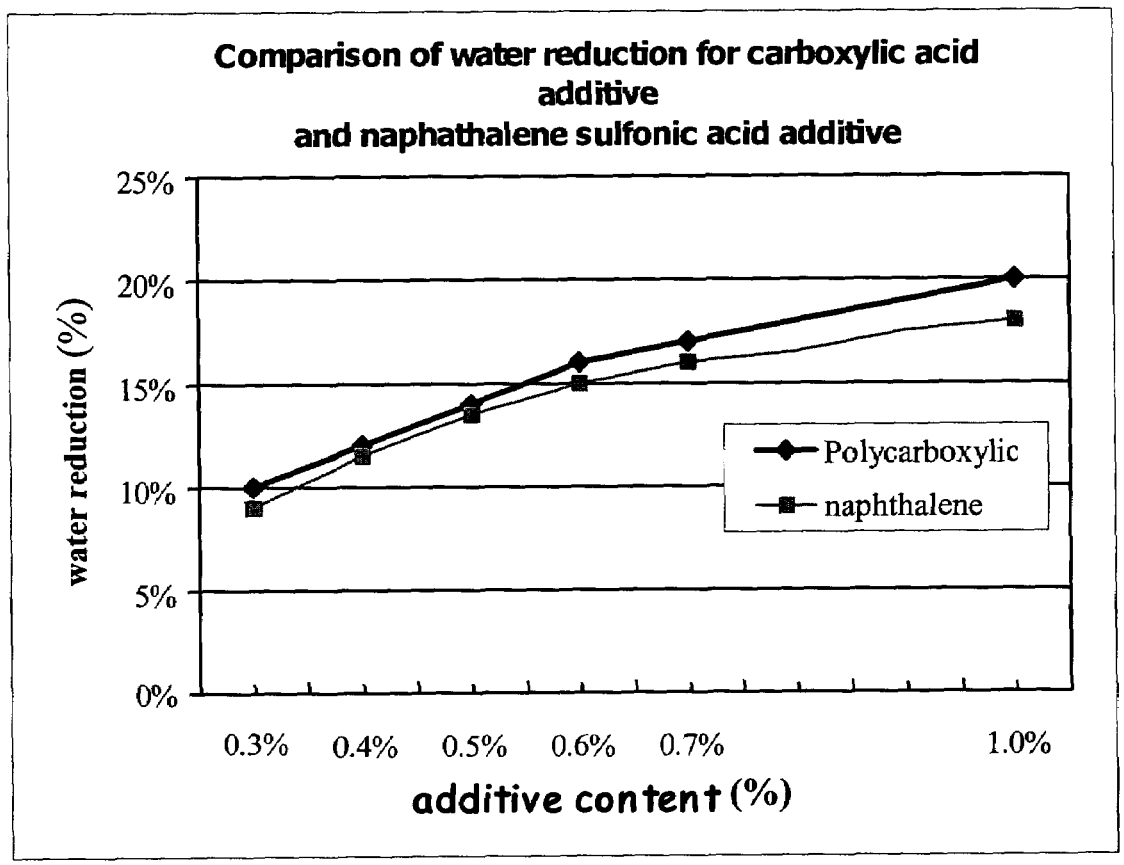
FIG. 1 is a diagram showing the water reduction for the concrete admixture additive of the present invention as compared to a prior art water reducer over a range of additive level.

The concrete admixture additive in the present invention is a type of glycol amine-glycol ether derivatives of olefins/cyclic olefins-maleic anhydride copolymers, or glycol amine-glycol ether derivatives of styrene-maleic anhydride copolymers, or glycol amine-glycol ether derivatives of styrene-olefins/cyclic olefins-maleic anhydride terpolymers.

The aforementioned polymers react with a certain amount of methoxy polyethylene glycol amine or polyethylene glycol monoalkyl ether, or a mixture of the two, followed by an acidation step, to produce carboxylated polymers. Then, alkaline reagents containing alkaline metal cations, alkaline earth metal cations or ammonium are used to convert the carboxylated polymers to ionic polymers which have the chemical formula:

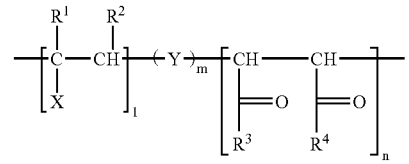

wherein $R^1$ is hydrogen or methyl;

$R^2$ is hydrogen or methyl;

X is selected from the group consisting of $C_6$-$C_{10}$ aromatic group, $C_6$-$C_{10}$ sulfonated aromatic group, $C_5$-$C_6$ cyclic alkyl group and $C_{1-10}$ alkoxy group;

Y is selected from the group consisting of $C_2$-$C_5$ saturated aliphatic group, $C_2$-$C_5$ unsaturated aliphatic group,

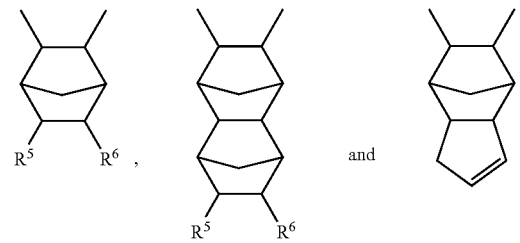

(wherein $R^5$ and $R^6$ are respectively selected from the group consisting of hydrogen, halogen, $C_{1-10}$ alkyl group, $C_{6-10}$ aromatic group, $C_{6-10}$ fluoroaromatic group, $C_{1-10}$ alkoxy group, $C_{2-10}$ alkenyl group, $C_{7-11}$ aromatic alkyl group, $C_{8-12}$ aromatic alkenyl group and $C_{7-11}$ alkyl aromatic group); and $R^3$ and $R^4$ are respectively $NHR^7$, $OR^7$, OH or $O^-M^+$ (wherein $M^+$ is alkaline metal cation, alkaline earth metal cation or ammonium, $R^7$ is an oxyalkenyl or polyoxyalkenyl having the formula $(ZO)_pR^8$ where Z is a $C_2$-$C_5$ aliphatic group, p can be any integer from 5 to 100 and $R^8$ is a $C_1$-$C_5$ aliphatic group or $C_6$-$C_{10}$ aromatic group); and l, m and n indicate molar ratios for different repeating units in the polymer composition, wherein (the letter) l is an integer from 0 to 25, m is an integer from 0 to 25, and n is an integer from 0 to 50, provided at least two of l, m and n are not zero. The preferred value for (the letter) l is from 0 to 10, for m from 0 to 10, and for n from 0 to 25. The more preferred value for (the letter) l is from 0 to 5, for m from 0 to 5, and for n from 0 to 25.

In the formula of the above chemical additive for concrete admixture, the preferred $R^1$ and $R^2$ is hydrogen.

In the formula of the above chemical additive for concrete admixture, the preferred X is phenyl or sulfonated phenyl.

In the formula of the above chemical additive for concrete admixture, a preferred Y is
—$CH_2$—$CH_2$—;
another preferred Y is —$CH_2$—CH=CH—$CH_2$—, or

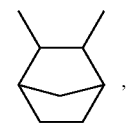

or a mixture of both;
another preferred Y is —$CH_2$—CH=CH—$CH_2$—, or

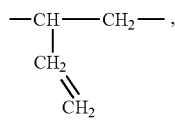

or a mixture of both;
another preferred Y is

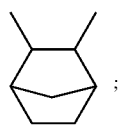

and still another preferred Y is

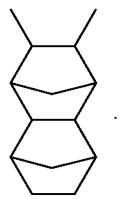

The preparation and synthesis method for the above high performance chemical additives for concrete admixture is as follows: adding the reagents in the following from the first to the fourth in order, conducting mixing and reaction at 20~180° C. to obtain the target products. The chemical compounds involved in the reaction are as follows:

(1) The first reagent contains 1~75% by weight of polymers with the formula:

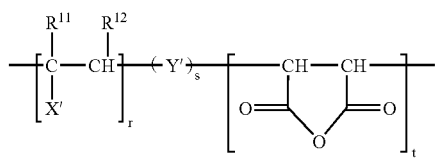

wherein
$R^{11}$ is hydrogen or methyl;
$R^{12}$ is hydrogen or methyl;
X' is selected from the group consisting of $C_6$-$C_{10}$ aromatic group, $C_6$-$C_{10}$ sulfonated aromatic group, $C_5$-$C_6$ cyclic alkyl group, and $C_{1-10}$ alkoxy group;
Y' is selected from the group consisting of $C_2$-$C_5$ saturated aliphatic group, $C_2$-$C_5$ unsaturated aliphatic group,

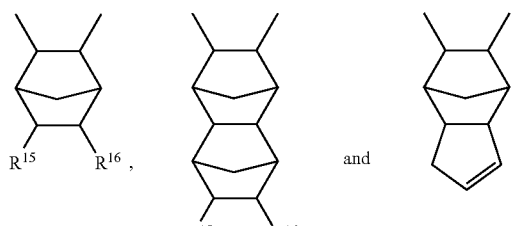

(wherein $R^{15}$ and $R^{16}$ are respectively selected from the group consisting of hydrogen, halogen, $C_{1-10}$ alkyl group, $C_{6-10}$ aromatic group, $C_{6-10}$ fluoroaromatic group, $C_{1-10}$ alkoxy group, $C_{2-10}$ alkenyl group, $C_{7-11}$ aromatic alkyl group, $C_{8-12}$ aromatic alkenyl group and $C_{7-11}$ alkyl aromatic group); and r, s and t indicate the molar ratios for respective repeating units in the polymer structure, wherein r is an integer from 0 to 25, s is an integer from 0 to 25, and t is an integer from 0 to 50, provided at least two of r, s and t are not zero. The preferred value for r is from 0 to 10, for s from 0 to 10, and for t from 0 to 25. The more preferred value for r is from 0 to 5, for s from 0 to 5, and for t from 0 to 25.

(2) The second reagent contains 1~75% by weight of oxyalkene or polyoxyalkene, having the formula $H_2N(Z'O)_q R^{18}$ or $HO(Z'O)_q R^{18}$, wherein Z' is a $C_2$-$C_5$ aliphatic group, q is an integer from 5 to 100, and $R^{18}$ is a $C_1$-$C_5$ aliphatic group or $C_6$-$C_{10}$ aromatic group.

(3) The third reagent contains 1~10% by weight of inorganic $H_2SO_4$, HCl, $HNO_3$, $BF_3$, $SnC_{12}$ or sulfonic organic acids such as $CH_3SO_3H$, $C_2H_5SO_3H$, $C_4H_9SO_3H$, $CF_3SO_3H$, $CCl_3SO_3H$, benzene sulfonic acid, p-xylene sulfonic acid, or o-xylene sulfonic acid.

(4) The fourth reagent contains 1~10% by weight of alkaline reagents represented by the formula $M(OR^{19})_v$, wherein M is alkaline metal like Na or K, or alkaline earth metal like Mg or Ca, or ammonium $NH_4$, v is the valence of M, and $R^{19}$ is selected from the group consisting of hydrogen, $C_{1-10}$ alkyl group, $C_{6-10}$ aromatic group, $C_{1-10}$ alkoxy group, $C_{7-11}$ aromatic alkyl group, $C_{8-12}$ aromatic alkenyl group and $C_{7-11}$ alkyl aromatic group.

In the formula of the above chemical additive for concrete admixture, the preferred $R^{11}$ and $R^{12}$ is hydrogen.

In the formula of the above chemical additive for concrete admixture, a preferred X' is phenyl or sulfonated phenyl.

In the formula of the above chemical additive for concrete admixture, a preferred Y' is —$CH_2$—$CH_2$—;
another preferred Y' is
—$CH_2$—CH=CH—$CH_2$—,
or

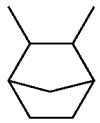

or a mixture of both;
another preferred Y' is —$CH_2$—CH=CH—$CH_2$—,
or

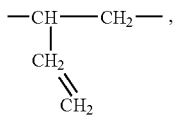

or a mixture of both;
another preferred Y' is

and still another preferred Y' is

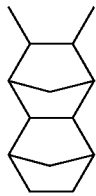

The following examples are given to illustrate the reactions practiced in some of the embodiments of the present invention for manufacturing the concrete admixture additive.

EXAMPLE 1

Put 5 units of norbornene, 25 units of maleic anhydride and 0.5 unit of AIBN in a reaction flask. Add 200 mL of benzene as solvent. Agitate the mixture for 10 minutes, followed by slow heating. Let the mixture react at 80° C. for 2 hours. After filtration, a white solid compound can be obtained. This product is a copolymer of norbornene and maleic anhydride, with average molecular weight of 4500.

EXAMPLE 2

Put 2.5 units of norbornene, 2.5 units of styrene, 25 units of maleic anhydride and 0.5 unit of AIBN in a reaction flask. Add 300 mL of benzene as solvent. Agitate the mixture for 10 minutes, followed by slow heating. Let the mixture react at 80° C. for 3 hours. After filtration, a white solid compound can be obtained. This product is a terpolymer of norbornene, styrene and maleic anhydride, with average molecular weight of 5600.

EXAMPLE 3

Put 26.5 units of styrene-maleic anhydride copolymer (3:10 molar ratio, average molecular weight 3800; Sartomer SMA® EF-30) in 100 units of isopropanol. Add 21.2 units of methoxy polyethylene glycol amine (EO:PO=32:10, average molecular weight 2000, Huntsman Jeffamine® M-2070). Heat the solution up to 90° C. Conduct the reaction under agitation for 5 hours. Add 1 M sulfuric acid and continue the reaction for 4 hours. Finally, neutralize the solution by 1N $NaOH_{aq}$. The product obtained is a brown, viscous liquid (Polymer E1).

By using the procedures in the example, we can obtain a series of glycol amine derivatives of styrene-maleic anhydride copolymer in different molar ratios by reacting it with methoxy polyethylene glycol amine with average molecular weight of 2000. The derivatives are in a viscous liquid state.

EXAMPLE 4

Put 26.5 units of styrene-maleic anhydride copolymer (3:10 molar ratio, average molecular weight 3800; Sartomer SMA® EF-30) in 100 units of isopropanol. Add 21.2 units of polyethylene glycol monomethyl ether (EO:PO=3:2, average molecular weight 750). Heat the solution up to 110° C. Conduct the reaction under agitation for 5 hours. Add 1M sulfuric acid and continue the reaction for 4 hours. Finally, neutralize the solution by 1N Ca $(OH)_{2aq}$. The product obtained is a brown, viscous liquid (Polymer E2).

By using the procedures in the example, we can obtain a series of glycol ether derivatives of styrene-maleic anhydride copolymer in different molar ratios by reacting it with polyethylene glycol monomethyl ether with average molecular weight of 750. The derivatives are in a viscous liquid state.

EXAMPLE 5

Put 26.5 units of styrene-maleic anhydride copolymer (3:10 molar ratio, average molecular weight 3800, Sartomer SMA® EF-30) in 100 units of isopropanol. Add 10.5 units of methoxy polyethylene glycol amine (EO:PO=32:10, average molecular weight 2000, Huntsman Jeffamine® M-2070). Add 10.7 units of polyethylene glycol monomethyl ether (EO:PO=3:2, average molecular weight 750). Heat the solution up to 90° C. Conduct the reaction under agitation for 5 hours. Raise the temperature to 110° C. and conduct the reaction for 2 hours. Add 1M sulfuric acid solutions and continue the reaction for 4 hours. Finally, neutralize the solution by 1N $NaOH_{aq}$. The product obtained is a brown, viscous liquid (Polymer E3).

By using the procedures in the example, we can obtain a series of glycol amine-glycol ether derivatives of styrene-maleic anhydride copolymer in different molar ratios by reacting it with methoxy polyethylene glycol amine with average molecular weight of 2000 and polyethylene glycol monomethyl ether with average molecular weight of 750. The derivatives are in a viscous liquid state.

EXAMPLE 6

Put 26.5 units of norbornene-maleic anhydride copolymer (1:5 molar ratio, average molecular weight of 4500, obtained from Example 1) in 100 units of isopropanol. Add 21.2 units of methoxy polyethylene glycol amine (EO:PO=32:10, average molecular weight of 2000, Huntsman Jeffamine® M-2070). Heat the solution up to 90° C. Conduct the reaction under agitation for 5 hours. Add 1M sulfuric acid solutions and continue the reaction for 4 hours. Finally, neutralize the solution by 1N Ca (OH)$_2$ solution. The product obtained is a brown, viscous liquid (Polymer E4).

By using the procedures in the example, we can obtain a series of glycol amine derivatives of norbornene-maleic anhydride copolymer in different molar ratios by reacting it with methoxy polyethylene glycol amine with average molecular weight of 2000. The derivatives are in a viscous liquid state.

EXAMPLE 7

Put 26.5 units of norbornene-maleic anhydride copolymer (1:5 molar ratio, average molecular weight of 4500, obtained from Example 1) in 100 units of isopropanol. Add 21.2 units of polyethylene glycol monomethyl ether (EO:PO=3:2, average molecular weight of 750). Heat the solution up to 110° C. Conduct the reaction under agitation for 5 hours. Add 1M sulfuric acid solutions and continue the reaction for 4 hours. Finally, neutralize the solution by 1N Ca (OH)$_2$ solution. The product obtained is a brown, viscous liquid (Polymer E5).

By using the procedures in the example, we can obtain a series of glycol ether derivatives of norbornene-maleic anhydride copolymer in different molar ratios by reacting it with polyethylene glycol monomethyl ether with average molecular weight of 750. The derivatives are in a viscous liquid state.

EXAMPLE 8

Put 26.5 units of norbornene-maleic anhydride copolymer (1:5 molar ratio, average molecular weight of 4500, obtained from Example 1) in 100 units of isopropanol. Add 10.5 units of methoxy polyethylene glycol amine (EO:PO=32:10, average molecular weight of 2000, Huntsman Jeffamine® M-2070). Add 10.7 units of polyethylene glycol monomethyl ether (EO:PO=3:2, average molecular weight of 750). Heat the solution up to 90° C. Conduct the reaction under agitation for 5 hours. Raise the temperature to 110° C. and continue the reaction for 2 hours. Add 1M sulfuric acid solutions and continue the reaction for 4 hours. Finally, neutralize the solution by 1N Ca (OH)$_2$ solution. The product obtained is a brown, viscous liquid (Polymer E6).

By using the procedures in the example, we can obtain a series of glycol amine-glycol ether derivatives of norbornene-maleic anhydride copolymer in different molar ratios by reacting it with methoxy polyethylene glycol amine with average molecular weight of 2000 and polyethylene glycol monomethyl ether with average molecular weight of 750. The derivatives are in a viscous liquid state.

EXAMPLE 9

Put 26.5 units of norbornene-styrene-maleic anhydride terpolymers (1:1:10 molar ratio, average molecular weight of 5600, obtained from Example 2) in 100 units of isopropanol. Add 21.2 units of methoxy polyethylene glycol amine (EO:PO=32:10, average molecular weight of 2000, Huntsman Jeffamine® M-2070). Heat the solution up to 90° C. Conduct the reaction under agitation for 5 hours. Add 1M sulfuric acid solutions and continue the reaction for 4 hours. Finally, neutralize the solution by 1N Ca (OH)$_2$ solution. The product obtained is a brown, viscous liquid (Polymer E7).

By using the procedures in the example, we can obtain a series of glycol amine derivatives of norbornene-styrene-maleic anhydride terpolymers in different molar ratios by reacting it with methoxy polyethylene glycol amine with average molecular weight of 2000. The derivatives are in a viscous liquid state.

EXAMPLE 10

Put 26.5 units of norbornene-styrene-maleic anhydride terpolymer (1:1:10 molar ratio, average molecular weight of 5600, obtained from Example 2) in 100 units of isopropanol. Add 21.2 units of polyethylene glycol monomethyl ether (EO:PO=3:2, average molecular weight of 750). Heat the solution up to 110° C. Conduct the reaction under agitation for 5 hours. Add 1M sulfuric acid solutions and continue the reaction for 4 hours. Finally, neutralize the solution by 1N Ca (OH)$_2$ solution. The product obtained is a brown, viscous liquid (Polymer E8).

By using the procedures in the example, we can obtain a series of glycol ether derivatives of norbornene-styrene-maleic anhydride terpolymers in different molar ratios by reacting it with polyethylene glycol monomethyl ether with average molecular weight of 750. The derivatives are in a viscous liquid state.

EXAMPLE 11

Put 26.5 units of norbornene-styrene-maleic anhydride terpolymers (1:1:10 molar ratio, average molecular weight of 5600, obtained from Example 2) in 100 units of isopropanol. Add 10.5 units of methoxy polyethylene glycol amine (EO:PO=32:10, average molecular weight of 2000, Huntsman Jeffamine® M-2070). Add 10.7 units of polyethylene glycol monomethyl ether (EO:PO=3:2, average molecular weight of 750). Heat the solution up to 90° C. Conduct the reaction under agitation for 5 hours. Raise the temperature to 110° C. and continue the reaction for 2 hours. Add 1M sulfuric acid solutions and continue the reaction for 4 hours. Finally, neutralize the solution by 1N Ca (OH)$_2$ solution. The product obtained is a brown, viscous liquid (Polymer E9).

By using the procedures in the example, we can obtain a series of glycol amine-glycol ether derivatives of norbornene-styrene-maleic anhydride terpolymers in different molar ratios by reacting it with methoxy polyethylene glycol amine with average molecular weight of 2000 and polyethylene glycol monomethyl ether with average molecular weight of 750. The derivatives are in a viscous liquid state.

EXAMPLE 12

Put 26.5 units of butadiene-maleic anhydride copolymers (Total Acid=12~14 wt %, average molecular weight of 3100, Sartomer Ricon® 130MA-13) in 100 units of isopropanol. Add 21.2 units of methoxy polyethylene glycol amine (EO:PO=32:10, average molecular weight of 2000, Huntsman Jeffamine® M-2070). Heat the solution up to 90° C. Conduct the reaction under agitation for 5 hours. Add 1M sulfuric acid solutions and continue the reaction for 4 hours. Finally, neutralize the solution by 1N Ca (OH)$_2$ solution. The product obtained is a brown, viscous liquid (Polymer E10).

By using the procedures in the example, we can obtain a series of glycol amine derivatives of butadiene-maleic anhydride copolymer in different molar ratios by reacting it with methoxy polyethylene glycol amine with average molecular weight of 2000. The derivatives are in a viscous liquid state.

EXAMPLE 13

Put 26.5 units of butadiene-maleic anhydride copolymers (Total Acid=12~14 wt %, average molecular weight of 3100, Sartomer Ricon® 130MA-13) in 100 units of isopropanol. Add 21.2 units of polyethylene glycol monomethyl ether (EO:PO=3:2, average molecular weight of 750). Heat the solution up to 110° C. Conduct the reaction under agitation for 5 hours. Add 1M sulfuric acid solutions and continue the reaction for 4 hours. Finally, neutralize the solution by 1N Ca (OH)$_2$ solution. The product obtained is a brown, viscous liquid (Polymer E11).

By using the procedures in the example, we can obtain a series of glycol ether derivatives of butadiene-maleic anhydride copolymer in different molar ratios by reacting it with polyethylene glycol monomethyl ether with average molecular weight of 750. The derivatives are in a viscous liquid state.

EXAMPLE 14

Put 26.5 units of butadiene-maleic anhydride copolymers (Total Acid=19~21 wt %, average molecular weight of 7500, Sartomer Ricon® 130MA-20) in 100 units of isopropanol. Add 10.5 units of methoxy polyethylene glycol amine (EO:PO=32:10, average molecular weight of 2000, Huntsman Jeffamine® M-2070). Add 10.7 units of polyethylene glycol monomethyl ether (EO:PO=3:2, average molecular weight of 750). Heat the solution up to 90° C. Conduct the reaction under agitation for 5 hours. Raise the temperature to 110° C. and continue the reaction for 2 hours. Add 1M sulfuric acid solution and continue the reaction for 4 hours. Finally, neutralize the solution by 1N Ca (OH)$_2$ solution. The product obtained is a brown, viscous liquid (Polymer E12).

By using the procedures in the example, we can obtain a series of glycol amine-glycol ether derivatives of butadiene-maleic anhydride copolymer in different molar ratios by reacting it with methoxy polyethylene glycol amine with average molecular weight of 2000 and polyethylene glycol monomethyl ether with molecular weight of 750. The derivatives are in a viscous liquid state.

EXAMPLE 15

Put 26.5 units of butadiene-maleic anhydride copolymers (Total Acid=19~21 wt %, average molecular weight of 7500, Sartomer Ricon® 131MA-20) in 100 units of isopropanol. Add 21.2 units of methoxy polyethylene glycol amine (EO:PO=32:10, average molecular weight of 2000, Huntsman Jeffamine® M-2070). Heat the solution up to 90° C. Conduct the reaction under agitation for 5 hours. Add 1M sulfuric acid solutions and continue the reaction for 4 hours. Finally, neutralize the solution by 1N Ca (OH)$_2$ solution. The product obtained is a brown, viscous liquid (Polymer E13).

By using the procedures in the example, we can obtain a series of glycol amine derivatives of butadiene-maleic anhydride copolymer in different molar ratios by reacting it with methoxy polyethylene glycol amine with average molecular weight of 2000. The derivatives are in a viscous liquid state.

Comparison of Water Reduction and Slump

To compare the water reduction and slump performance of the concrete admixture additive of the present invention with a prior art water reducer, two additives are prepared. First, use the carboxylated polymer prepared in Example 5 to prepare a water reducer with 15% solid content. The solution can be blended into a mixture of cement and water to make concrete admixture. Then a powdery naphthalene sulfonic acid water reducer with 92% solid content to mix with water and cement to prepare concrete admixture. Both water reducers were prepared and tested at the same additive contents by weight.

The water reduction tests were conducted according to the ASTM C494 standard test method, which specifies 307 kg/m$^3$ cement usage and 210 kg/m$^3$ water usage in the control group. The mixing was performed according to the ASTM C192 standard test method, which specifies agitator-mixing operation for 3 minutes, stop for 3 minutes, and operation for 2 minutes.

The results of the water reduction tests were summarized in TABLE 1 and FIG. 1. It can be seen from TABLE 1 that the concrete admixture additive of the present invention provides excellent water reduction even at low additive content.

It can also be seen from FIG. 1 that the carboxylic acid water reducer of the present invention provides higher water reduction than the traditional naphthalene sulfonic acid water reducer. When water reducer is used at more than 1%, naphthalene sulfonic acid water reducer has poor water reduction along with bleeding and serious retarded coagulation.

TABLE 1

|       | Cement (kg/m$^3$) | Water (kg/m$^3$) | Fine (kg/m$^3$) | coarse (kg/m$^3$) | Water reducer (kg/m$^3$) | Carboxylic acid type Water reduction |
|-------|-------------------|------------------|-----------------|-------------------|--------------------------|--------------------------------------|
| Plain | 307               | 210              | 837             | 930               | 0                        | 0                                    |
| No. 1 | 307               | 191              | 906             | 985               | 0.92(0.3%)               | 10%                                  |
| No. 2 | 307               | 187              | 919             | 996               | 1.23(0.4%)               | 12%                                  |
| No. 3 | 307               | 183              | 921             | 1000              | 1.56(0.5%)               | 14%                                  |
| No. 4 | 307               | 179              | 924             | 1005              | 1.84(0.6%)               | 16%                                  |
| No. 5 | 307               | 174              | 932             | 1014              | 2.14(0.7%)               | 17%                                  |
| No. 6 | 307               | 168              | 935             | 1017              | 3.07(1.0%)               | 20%                                  |

Figure 2:
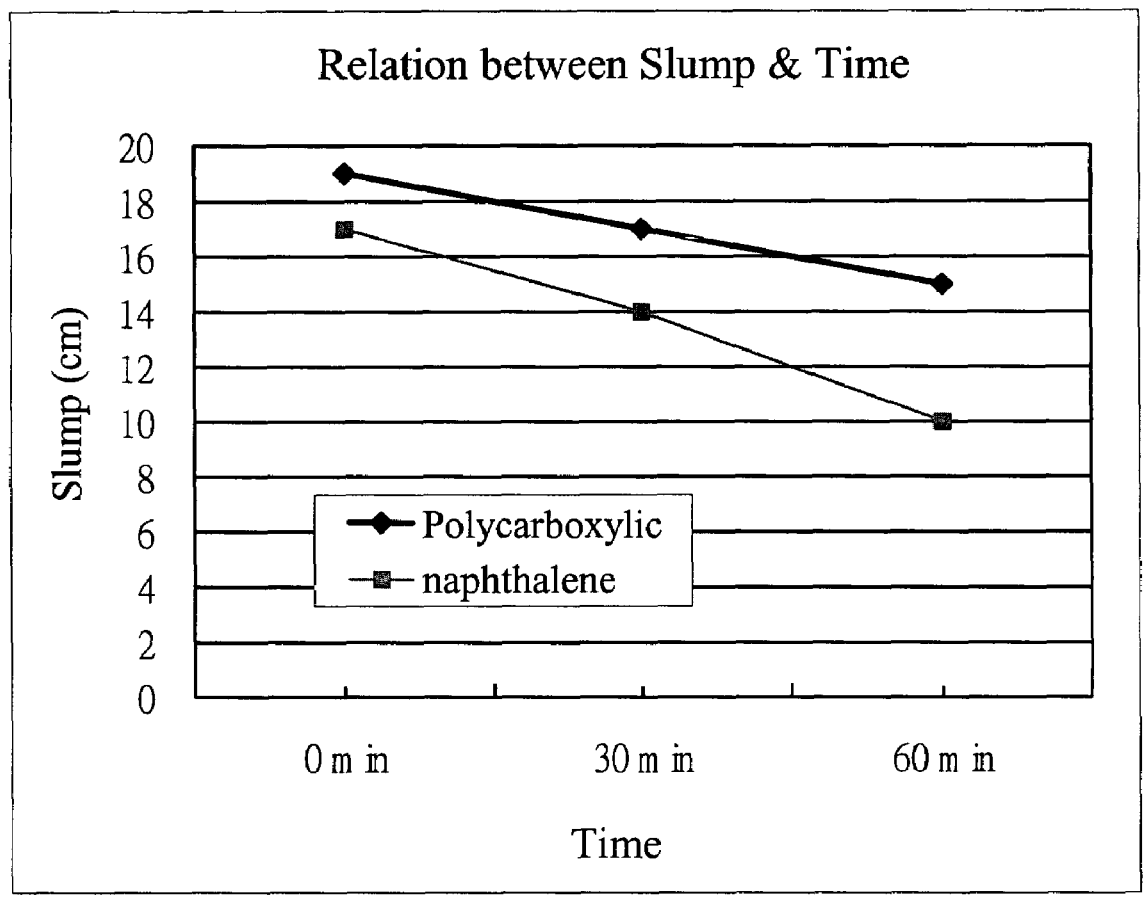
FIG. 2 is a diagram showing the concrete slump for the concrete admixture additive of the present invention as compared to a prior art water reducer as a function of time.

Similarly, it can be seen from TABLE 2 and FIG. 2 that the naphthalene sulfonic acid water reducer causes more serious slump than the carboxylic acid water reducer of the present invention.

The slump and compression strength as a function of time were summarized in TABLE 2 for the additive of the present invention and for the naphthalene sulfonic acid water reducer.

TABLE 2

| Additive type | Slump (cm) | | | Compression strength (psi) | | | |
|---|---|---|---|---|---|---|---|
| | 0 min | 30 mim | 60 min | 1 day | 7 day | 14 day | 28 day |
| Polycarboxylic Acid | 19 | 17 | 15 | 492 | 2791 | 3997 | 5432 |
| Naphthalene | 17 | 14 | 10 | 521 | 2731 | 3966 | 5374 |

From the above test results, we conclude that the chemical additive for concrete admixture of the present invention provides excellent water reduction, high concrete flowability, good slump performance, high compression strength and early hardening strength, as compared to the prior art water reducer.

What is claimed is:

1. A concrete admixture additive having the formula:

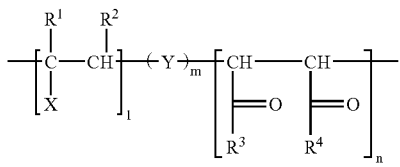

wherein $R^1$ is hydrogen or methyl;
$R^2$ is hydrogen or methyl;
X is selected from the group consisting of $C_6$-$C_{10}$ aromatic group, $C_6$-$C_{10}$ sulfonated aromatic group, $C_5$-$C_6$ cyclic alkyl group, and $C_{1\text{-}10}$ alkoxy group;
Y is selected from the group consisting of

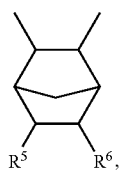 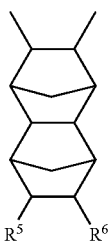 and 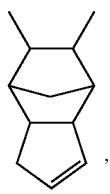 , wherein $R^5$ and $R^6$ are respectively selected from the group consisting of hydrogen, halogen, $C_{1\text{-}10}$ alkyl group, $C_{6\text{-}10}$ aromatic group, $C_{6\text{-}10}$ fluoroaromatic group, $C_{1\text{-}10}$ alkoxy group, $C_{2\text{-}10}$ alkenyl group, $C_{7\text{-}11}$ aromatic alkyl group, $C_{8\text{-}12}$ aromatic alkenyl group and $C_{7\text{-}11}$ alkyl aromatic group;
$R^3$ and $R^4$ are respectively selected from the group consisting of $NHR^7$, $OR^7$, OH and $O^-M^+$, wherein $M^+$ is an alkaline metal cation, alkaline earth metal cation, or ammonium, $R^7$ is an oxyalkenyl or polyoxyalkenyl, having the formula $(ZO)_pR^8$, wherein Z is a $C_2$-$C_5$ aliphatic group, p is an integer from 5 to 100, and $R^8$ is a $C_1$-$C_5$ aliphatic group or $C_6$-$C_{10}$ aromatic group;

l is an integer from 0 to 25;
m is an integer from 1 to 25; and
n is an integer from 0 to 50, and both l and n are not zero simultaneously.

2. The concrete admixture additive according to claim 1, wherein l is an integer from 0 to 10; m is an integer from 1 to 10; and n is an integer from 0 to 25.

3. The concrete admixture additive according to claim 1, wherein
l is an integer from 0 to 5;
m is an integer from 1 to 5; and
n is an integer from 0 to 25.

4. The concrete admixture additive according to claim 1, wherein $R^1$ is hydrogen.

5. The concrete admixture additive according to claim 1, wherein $R^2$ is hydrogen.

6. The concrete admixture additive according to claim 1, wherein X is phenyl.

7. The concrete admixture additive according to claim 1, wherein X is sulfonated phenyl.

8. The concrete admixture additive according to claim 1, wherein Y is

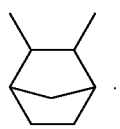 .

9. The concrete admixture additive according to claim 1, wherein Y is

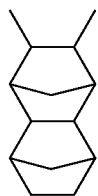 .

* * * * *